United States Patent [19]

Kilian

[11] Patent Number: 5,245,319
[45] Date of Patent: Sep. 14, 1993

[54] SYNCHRONIZED STEREOSCOPIC DISPLAY SYSTEM

[75] Inventor: Alan E. Kilian, Minneapolis, Minn.

[73] Assignee: Cray Research, Inc., Eagan, Minn.

[21] Appl. No.: 13,165

[22] Filed: Feb. 2, 1993

Related U.S. Application Data

[63] Continuation of Ser. No. 669,489, Mar. 14, 1991, abandoned.

[51] Int. Cl.⁵ .......................... G09F 9/37; H04N 13/00
[52] U.S. Cl. ............................................ 345/9; 358/88; 359/462
[58] Field of Search ............................. 358/88, 92, 91; 359/462, 464; 340/787, 705

[56] References Cited

U.S. PATENT DOCUMENTS 4,649,425  3/1987  Pund .................................... 358/88
4,833,464  5/1989  Santo et al. ......................... 340/787

Primary Examiner—Alvin E. Oberley
Assistant Examiner—Kara Farnandez
Attorney, Agent, or Firm—Merchant, Gould, Smith, Edell, Welter & Schmidt

[57] ABSTRACT

A system for stereographic display in a computer system having a display medium has an image data file having data for right and left eye images encoded with visible signal data, so that when the right and left eye images are displayed on the display medium the corresponding visible signal is also displayed. A sensor senses the displayed visible signal and is coupled to glasses or goggles having right and left eye shutters. The right and left eye shutters open and close in response to the visible signal sensed.

7 Claims, 3 Drawing Sheets

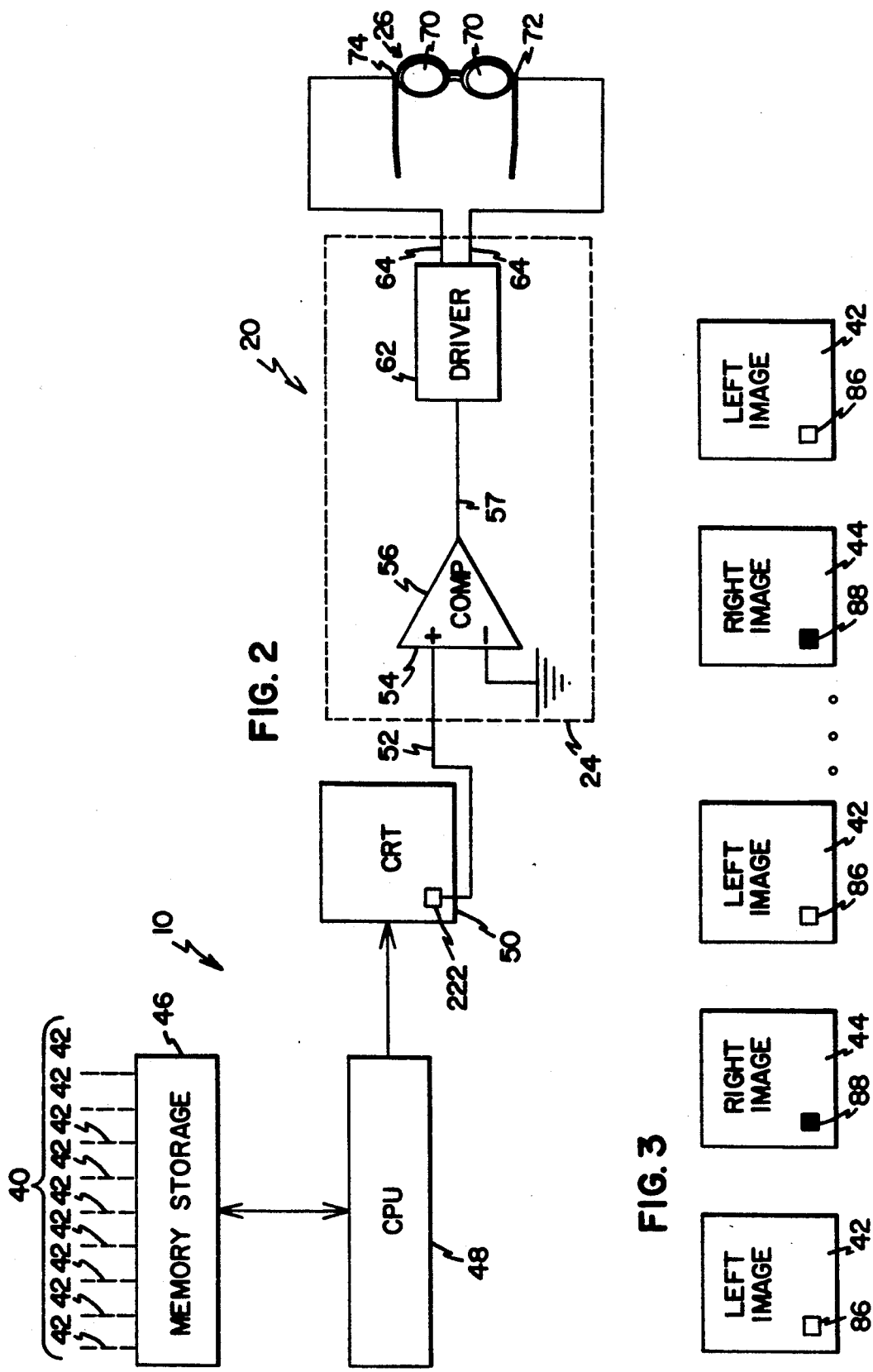

SYNCHRONIZED STEREOSCOPIC DISPLAY SYSTEM

This is a continuation of application Ser. No. 07/669,489, filed Mar. 14, 1991, now abandoned.

TECHNICAL FIELD OF THE INVENTION

The present invention relates generally to stereographic display systems. More particularly, the invention relates to display systems wherein right and left images are alternately displayed and synchronized with the shutters of viewing glasses to produce a stereographic effect.

BACKGROUND OF THE INVENTION

In stereographic viewing systems of the type of the present invention, alternately displayed right and left stereographic images are viewed through a pair of viewing goggles or glasses wherein the lenses are shuttered to alternately open and close in synchrony with the images to produce a stereographic effect. Several different means are known for controlling the shutters and synchronizing their opening and closing to the display of the images, to assure that the right eye views the right eye images and the left eye views the left eye images, as required for a stereographic effect. U.S. Pat. No. 3,737,567 to Kratomi, issued Jun. 5, 1973, teaches the use of sound for this purpose. In U.S. Pat. No. 4,562,463 to Lipton, issued Dec. 31, 1985, an infrared signal is transmitted to infrared detectors in the viewing glasses. The signal is synchronized with the display of right and left images, and in turn controls the shuttered internal lenses in the viewing glasses. In Nakagawa et al., U.S. Pat. No. 4,772,943, issued Sep. 20, 1988, and Nakagawa et al., U.S. Pat. No. 4,870,486, issued Sep. 26, 1989, there is disclosed a shutter control system which, as best understood, is triggered by the refreshing of the CRT displaying the alternating right and left images.

One limitation in the Nakagawa system, and in other systems as well, is the ability to establish and maintain synchronization of the shutter control signal with the displayed images, as is essential to creating the stereographic effect. In particular, the Nakagawa system requires the user of the system to select the proper phase of the synchronization signal so that the right and left eye images are properly synchronized to the opening and the closing of the right and left shutters of the viewing glasses. Once synchronized, the system of Nakagawa will remain in synchrony so long as right and left eye images are alternately displayed. However, if a strict alternating display is not maintained, synchronization is lost. Thus, these types of systems cannot function where such alternating display cannot be guaranteed. One place where such alternating display cannot be guaranteed is in the field of computer generated graphics, where it is not always possible to guarantee the real time operation required for this purpose.

Other stereographic viewing systems suffer from the lack of portability from one system to the other. For instance, some systems require that the image information, or data, for each frame be coded with a header identification, as for example, those identifications used in a computer graphics application which specifies whether the image is a right eye image or a left eye image. This information can be identified by the computer system hardware, which in turn controls the shutters of the viewing glasses. Since there is not an industry standard system architecture/hardware for this purpose, the stereographic image files storing the alternating right and left images cannot be readily transported between different systems.

Thus, there is a need for a stereographic viewing system which is readily transportable from one system to another or one display medium to another, and wherein synchrony may be literally maintained irrespective of guaranteed alternation between right and left images.

SUMMARY OF THE INVENTION

The present invention provides a stereographic display system which provides automatic synchronization of the opening and closing of shutters in a pair of viewing glasses with the display of right or left eye images on a display medium, while also providing for ready portability between different types of display systems.

The system includes an image data file having data for right and left eye images. The right and left eye image data is encoded so that when the right and left eye images are displayed on the display medium, a corresponding visible signal is displayed along with the right and left eye images. The visible signal has two states, one state corresponding to the right eye image and the other state corresponding to the left eye image. Sensing means included in the system senses the displayed visible signal and controls the right and left eye shutters of the viewing glasses. Thus, the right and left eye shutters open and close the right and left eye visual pathways in response to the state of the displayed visible signal sensed, whereby synchronization is achieved.

BRIEF DESCRIPTION OF THE DRAWINGS

FIG. 2 is a block diagram of the computer system with the stereographic display system of FIG. 1;

FIG. 3 shows a series of display images displayed in the computer system with a stereographic display system of the present invention.

DETAILED DESCRIPTION OF THE INVENTION

In the following detailed description of the preferred embodiment, references are made to the figures which form a part hereof and in which the invention may be practiced. This embodiment is described in sufficient detail for those skilled in the art to practice the invention and it is to be understood that other embodiments may be utilized without departing from the spirit and scope of the present invention. The following detailed description is therefore not to be taken in a limiting sense and the scope of the present invention is defined by the appended claims.

Figure 1:
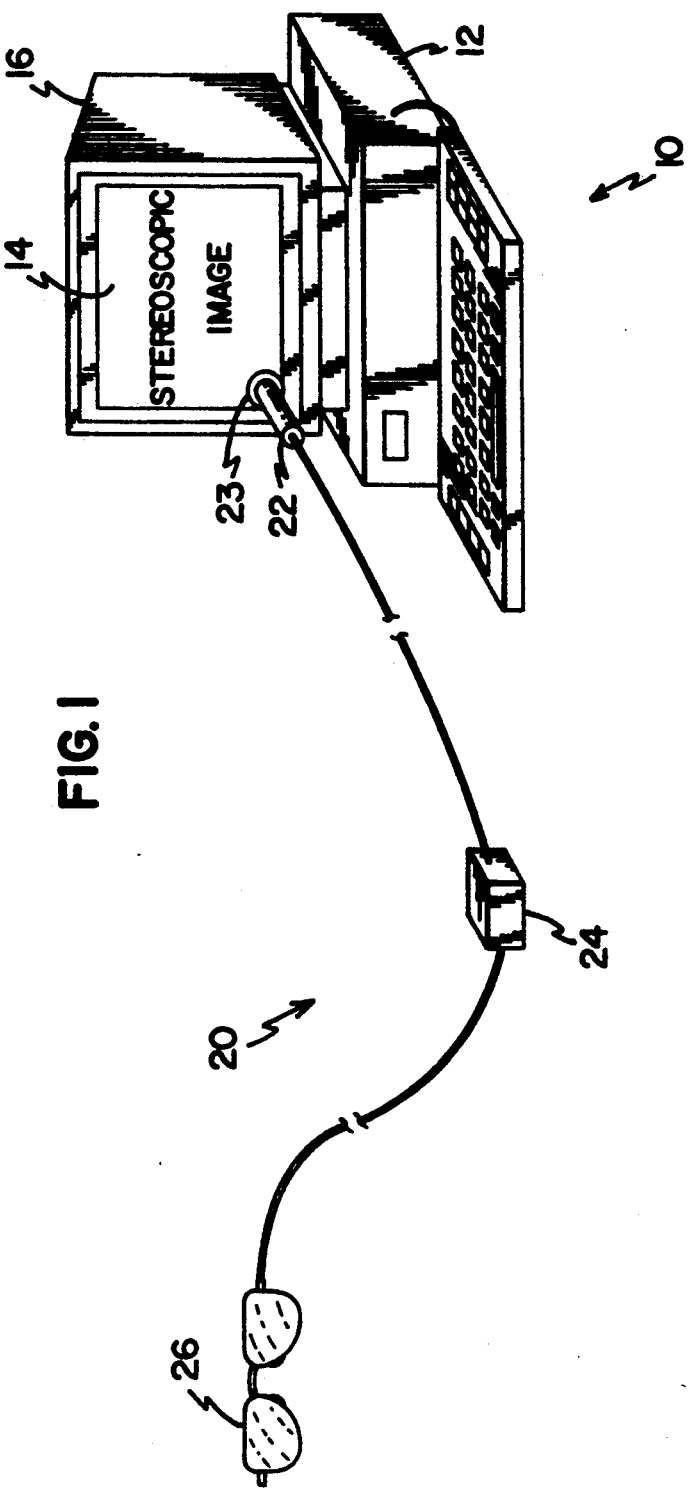
FIG. 1 is a perspective view showing a computer system with a system for stereographic display.

Referring now to FIGS. 1, 2 and 3, a first embodiment of the synchronized stereographic display system of the present invention will be described. FIG. 1 shows a perspective view of a computer system 10 coupled to a shutter synchronization system 20. System 10 includes a computer unit 12 coupled to a display medium 16 for displaying the stereographic images 14. A photosensor 22 is positioned at or near the surface of the display medium 16 by a suction cup 23. Photosensor 22 senses a visible signal (86,88, FIG. 3) embodied in the images 14, and provides a corresponding signal to control unit 24 via signal path 52. The shutter control signal on path 52 is applied to input 54 of comparative 56, which compares the signal against a reference signal (ground), which in turn applies its output through conductor 57 to driver 62. Driver 62 generates shutter control signal 64 to control the shutters 70 of glasses 26. Preferably, glasses 26 include liquid crystal shuttered lenses 72 and 74, as are known in the art.

FIG. 3 illustrates the image and coding system according to the present invention, which when used in conjunction with the synchronization system 20, provides synchronization of the shutters 70 of the viewing glasses 26 with the appropriate stereoscopic images. The visible signal is encoded in a predetermined area of each image, as represented in FIG. 3 by the square area in the lower left-hand corner of each image. In the illustrative example of FIG. 3, the left eye images 42 are encoded with a light, or bright visible signal; the right eye images 44 are encoded with a black area or the absence of light. With the photosensor 22 positioned on the surface of the display medium 16 in a position corresponding to the predetermined location of the encoded signal, the photosensor 22 responds to the presence or absence of the visible signal 86 and 88, respectively. Synchronization system 20 in turn is configured to respond to the output from the photosensor 22 to shutter left lens 74 open and right lens 72 closed during the presence of a left eye image 42 as determined by a presence of a visible signal 86 in the predetermined area and to shutter right lens 72 open and left lens 74 closed in the absence of a visible signal 88 in the predetermined area.

The above-described system thus provides that the viewing glasses will remain in synchrony with the right and left eye images even if guaranteed alternation between images cannot be obtained. Furthermore, the system can be adapted for use with a wide variety of display systems. For example, it can be used in computerized systems wherein the images are stored in a memory or mass storage system of a computer, and displayed under program control. It may also be used with television, wherein the images are transmitted to a viewer's television through a standard broadcast system. As will be explained below, the system is further adaptable to use with projection-type image systems.

It shall be understood that the invention is in no way limited to the use of light and dark encoded signals and a corresponding photosensor device. Rather, the invention contemplates alternate embodiments wherein a synchronization signal is encoded into the displayed image, and means are provided for detecting the displayed encoded signal. The encoded signal may or may not be visible to the user, but would be generated within the spectrum of wavelengths the display systems are capable of displaying. Furthermore, it is contemplated that the photosensor detector circuit could be integrated into the CRT or other display apparatus so as to be essentially hidden from the user's view, with the other elements of the control unit 24 of the synchronization system integrated into the circuitry of the CRT or other display apparatus. It is further contemplated that a jack could be provided in the display apparatus for coupling to the viewing glasses.

In the computer graphics display environment, it is contemplated that the encoded signals 86 and 88 would be embedded in the image data for the images. An image data file 40 includes the alternating right and left eye images 42 and 44. As shown in FIG. 2, this image data is stored in a memory storage device 46, which may be random access memory, magnetic storage, optical disk storage, or the equivalent with a CPU 48 reading the image data and utilizing display circuits to present the images on the CRT 50. In the case where the images are stored in analog form, for example on film, the encoded signals 86 and 88 would be encoded directly on the frames of each image.

Figure 4:
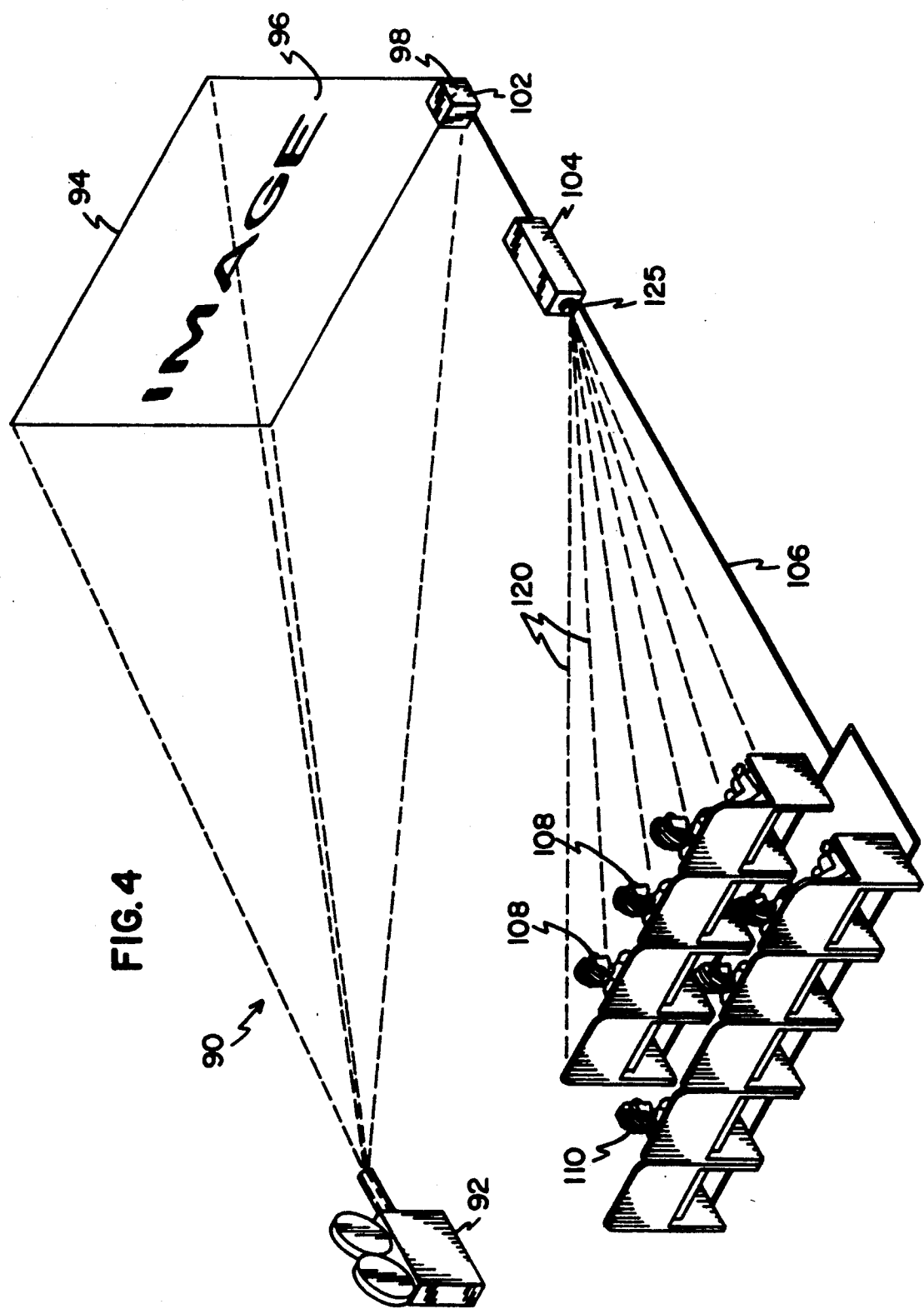
FIG. 4 is a perspective view showing two related embodiments of a stereographic display system of the present invention utilized in a projection setting.

Turning now to FIG. 4, an embodiment of the invention is shown utilizing a projection-type display system, for example, those commonly used in movie theatres. In this embodiment, a projector 92 projects an image 96 on a screen 94. The image includes an encoded signal in the frame of each image on the film, which encoded signal is projected onto a predetermined area 98 of the screen 94. A photosensor unit 102 is placed directly adjacent to and in front of the screen at the predetermined area 98 whereupon the encoded signal is sensed by the photosensor 102, which in turn passes its output to unit 104, which is constructed in the same manner as control unit 24 as illustrated in FIG. 2. Driver signals 106 are fanned out from the unit 104 to the seats in the theatre which in turn include jacks or plugs for connecting viewing glasses 108, worn by observers 110. Alternatively, unit 104 may include an infrared transmitter 125, which transmits an infrared signal 120 to viewing glasses 108 which receive the infrared signal and use it to control the opening and closing of the shutters, as for example taught by U.S. Pat. No. 4,562,463 to Lipton. The system does provide that stereographic effect may be obtained by using conventional projection equipment.

Thus, there has been described above a shutter synchronization system which is readily transported and adapted for use with a variety of display systems and display mediums, and which will guarantee synchronization even in the absence of strict alternation between right and left eye images. Although described herein in its preferred form, those with skill in the art will recognize that many modifications and changes may be made thereto without departing from the spirit and the scope of the invention as set forth in the claims appended hereto.

What is claimed is:

1. In a computer system having a display medium and means for displaying images of an image data file, a system for stereographic display comprising:
an image data file having data for right and left eye images displayed in discrete, normally alternating frames wherein the frames are displayed at successive instances in time to form a motion picture, the right and left eye image data encoded with visible signal data so that when the right and left eye image frames are displayed on the display medium a corresponding visible signal is displayed therewith in a predetermined position, the visible signal having two states, a first state corresponding to a right eye image frame and a second state corresponding to a left eye image frame, the visible signal covering a certain area of the display medium;
a photosensor positioned over said certain area of the display medium for sensing the displayed visible signal, the photosensor generating an image output signal having first and second states corresponding respectively to the first and second states of the visible signal and the respective right eye image frames and left eye image frames, wherein the image output signal changes state from one instance in time to the next based upon the change in display of a right eye image frame to a left eye image frame and vice versa, and holds the same state from one instance in time to the next when the same image frame is displayed at successive instances in time so that the output signal at all times corresponds directly to whether the displayed image frame is for a right eye image or for a left eye image and does not depend on the regular alternation between right and left eye image frames;

observation means for observing the right and left eye images, the observation means having right and left eye shutter means for opening and closing right and left eye visual pathways in response to respective first and second control signals, one for each shutter means; and control circuit means independent of said display medium and receiving only said image output signal from the photosensor means for generating, in direct response to said image output signal, said first and second control signals to control said right and left shutter means, respectively, so that the right eye shutter means opens when the image output signal corresponds to the right eye image and the left eye shutter means opens when the image output signal corresponds to the left eye control, image whereby said control circuit means generates said first and second control signals without regard to the alternation of frame images on said display medium and without regard to a detection of any interlace scanning used in the display medium.

2. The system of claim 1 further wherein the photosensor is positioned over said certain area with a suction cup attached to the surface of the display medium.

3. The system of claim 1 further wherein the control circuit means includes a comparator receiving said image output signal and comparing it against a reference signal to determine whether said image output signal corresponds to said first or said second state, the comparator producing an output signal having corresponding first and second states and used to control the generation of said first and second control signals.

4. The system of claim 3 further wherein said control circuit means includes a driver circuit receiving said output signal from said comparator and generating said first and second control signals in response to the output signal of said comparator.

5. In a computer system having a display medium and means for displaying images of an image data file, a method for stereographic display which does not depend on the regular alternation of frame images, comprising the steps of:

(a) providing an image data file having data for right and left eye images to be displayed in discrete, normally alternating frames wherein the frames are displayed at successive instances in time to form a motion picture;

(b) encoding the right and left eye image data with visible signal data so that when the right and left eye image frames are displayed on the display medium a corresponding visible signal is displayed therewith in a predetermined position on the display medium, the visible signal having two states, a first state corresponding to a right eye image frame and a second state corresponding to a left eye image frame, the visible signal covering a certain area of the display medium;

(c) displaying the frames of the encoded image data file with said means for displaying, said frames normally displayed so that they alternate back and forth from an image frame for the right eye to an image frame for the left eye, but from time to time displaying an image frame for the same eye two or more times in a row when said means for displaying does not have sufficient computer system resources to change the image frame to the next successive alternate eye image;

(d) providing a photosensor and positioning said photosensor over said certain area of the display medium for sensing the displayed visible signal, the photosensor generating an image output signal having first and second states corresponding respectively to the first and second states of the visible signal and the respective right eye image frames and left eye image frames, wherein the image output signal changes state from one instance in time to the next based upon the change in display of a right eye image frame to a left eye image frame and vice versa, and holds the same state from one instance in time to the next when the same image frame is displayed at successive instances in time so that the output signal at all times corresponds directly to whether the displayed image frame is for a right eye image or for a left eye image and does not depend on the regular alternation between right and left eye image frames;

(e) providing observation means for observing the right and left eye images, the observation means having right and left eye shutter means for opening and closing right and left eye visual pathways in response to respective first and second control signals, one for each shutter means; and (f) using said image output signal and no other signals from said computer system or display medium to generate said first and second control signals, said first and second control signals changing in direct response to the change in state of said image output signal so that the right eye shutter means opens when the image output signal corresponds to the right eye image and the left eye shutter means opens when the image output signal corresponds to the left eye image, and so that said first and second control signals are generated without regard to the alternation of frame images on said display medium and without regard to a detection of any interlace scanning used in the display medium.

6. The method of claim 5 further including the step of positioning the photosensor over said certain area with a suction cup attached to the surface of the display medium.

7. The system of claim 5 further including the step of comparing said image output signal against a reference signal to determine whether said image output signal corresponds to said first or said second state.

* * * * *